(12) United States Patent
Guter

(10) Patent No.: US 9,623,489 B2
(45) Date of Patent: Apr. 18, 2017

(54) ROTARY TOOL AND METHOD FOR MANUFACTURING A ROTARY TOOL

(71) Applicant: Kennametal Inc., Latrobe, PA (US)

(72) Inventor: Tim Guter, Zirndorf (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 14/734,755

(22) Filed: Jun. 9, 2015

(65) Prior Publication Data
US 2015/0360302 A1 Dec. 17, 2015

(30) Foreign Application Priority Data

Jun. 12, 2014 (DE) .................. 10 2014 108 219

(51) Int. Cl.
B23B 51/06 (2006.01)
B23B 51/02 (2006.01)
(52) U.S. Cl.
CPC .............. *B23B 51/06* (2013.01); *B23B 51/02* (2013.01); *B23B 2251/046* (2013.01); *Y10T 408/45* (2015.01); *Y10T 408/455* (2015.01)
(58) Field of Classification Search
CPC ........ B23B 2251/046; B23B 2251/043; B23B 51/06; B23B 2251/408; Y10T 408/455; Y10T 408/45
See application file for complete search history.

(56) References Cited

U.S. PATENT DOCUMENTS

| | | |
|---|---|---|
| 960,526 A | 6/1910 | Erlandsen |
| 1,425,122 A | 8/1922 | McKechnie et al. |
| 2,325,973 A * | 8/1943 | Nurnberger ............ B23B 51/06 408/226 |
| 2,411,209 A | 11/1946 | Hall et al. |
| 2,816,464 A | 12/1957 | Willingham |
| 3,037,264 A | 6/1962 | Mossberg |

(Continued)

FOREIGN PATENT DOCUMENTS

| | | |
|---|---|---|
| CH | 551830 A * | 7/1974 |
| DE | 3545586 | 7/1987 |

(Continued)

OTHER PUBLICATIONS

Machine translation, Rotary Cutter body and Boring method by rotary cutter, JP 2005-526348A, Osakabe, Fumio., Sep. 29, 2005.*

*Primary Examiner* — Daniel Howell
*Assistant Examiner* — Chwen-Wei Su
(74) *Attorney, Agent, or Firm* — Ian K. Samways

(57) ABSTRACT

The invention relates to a rotary tool (2), in particular a drill, having a cutting part (10) that extends in a longitudinal direction (8) from a clamping shank (6) arranged in a rearward region (22) to a tool front (12) arranged in a forward region (20), and in which helically running chip flutes (14) and continuously helically running coolant channels (36) are fashioned, such that an exit opening (42) of each coolant channel (36) is arranged in the respective chip flute (14), wherein the chip flutes (14) are each shaped with an angle of twist (α) varying in the longitudinal direction (8) such that, in the forward region (20) facing towards the tool front (12), the respective coolant channel (36) is intersected by the respective chip flute (14) so as to fashion the exit opening (42).

19 Claims, 3 Drawing Sheets

(56) References Cited

U.S. PATENT DOCUMENTS

| | | | |
|---|---|---|---|
| 3,045,513 | A | 7/1962 | Andreasson |
| 3,368,257 | A | 2/1968 | Andreasson |
| 3,597,817 | A | 8/1971 | Whalley |
| 3,861,011 | A | 1/1975 | Nose et al. |
| 4,561,813 | A * | 12/1985 | Schneider ............... B23B 51/02 408/228 |
| 4,643,621 | A | 2/1987 | Fuller, Jr. et al. |
| 4,705,435 | A | 11/1987 | Christoffel |
| 4,762,444 | A | 8/1988 | Mena |
| 5,382,121 | A | 1/1995 | Bicknell |
| 5,829,926 | A * | 11/1998 | Kammermeier ........ B23B 51/02 408/57 |
| 6,030,155 | A * | 2/2000 | Scheer ................... B23B 51/02 408/223 |
| 6,045,301 | A | 4/2000 | Kammermeier et al. |
| 6,210,083 | B1 * | 4/2001 | Kammermeier ........ B23B 51/06 279/20 |
| 6,652,203 | B1 * | 11/2003 | Risen, Jr. ............... B23B 51/02 408/225 |
| 8,257,000 | B2 * | 9/2012 | Onose .................... B23B 51/02 408/230 |
| 2003/0103820 | A1 | 6/2003 | Frejd |
| 2003/0185640 | A1 * | 10/2003 | Ito ......................... B23B 51/02 408/230 |
| 2006/0204345 | A1 | 9/2006 | Borschert et al. |
| 2010/0150673 | A1 | 6/2010 | Schneider et al. |
| 2012/0288337 | A1 * | 11/2012 | Sampath ................ B23B 51/02 408/57 |
| 2013/0004253 | A1 | 1/2013 | Kauper |

FOREIGN PATENT DOCUMENTS

| | | | |
|---|---|---|---|
| DE | 4128028 | | 2/1993 |
| EP | 0363734 A2 * | 4/1990 | .......... E21B 10/445 |
| EP | 0419428 A1 | | 3/1991 |
| EP | 0482982 A1 | | 4/1992 |
| EP | 0545826 A1 | | 6/1993 |
| EP | 0768136 A1 | | 4/1997 |
| EP | 1941960 A1 | | 7/2008 |
| GB | 191419371 | | 0/0000 |
| JP | 3109645 | | 3/2005 |
| JP | 2005262348 A * | 9/2005 | |
| JP | 2009190116 A * | 8/2009 | |
| JP | 2012200836 A * | 10/2012 | |
| JP | 2013193159 A * | 9/2013 | |
| WO | 2011116540 | | 9/2011 |

* cited by examiner

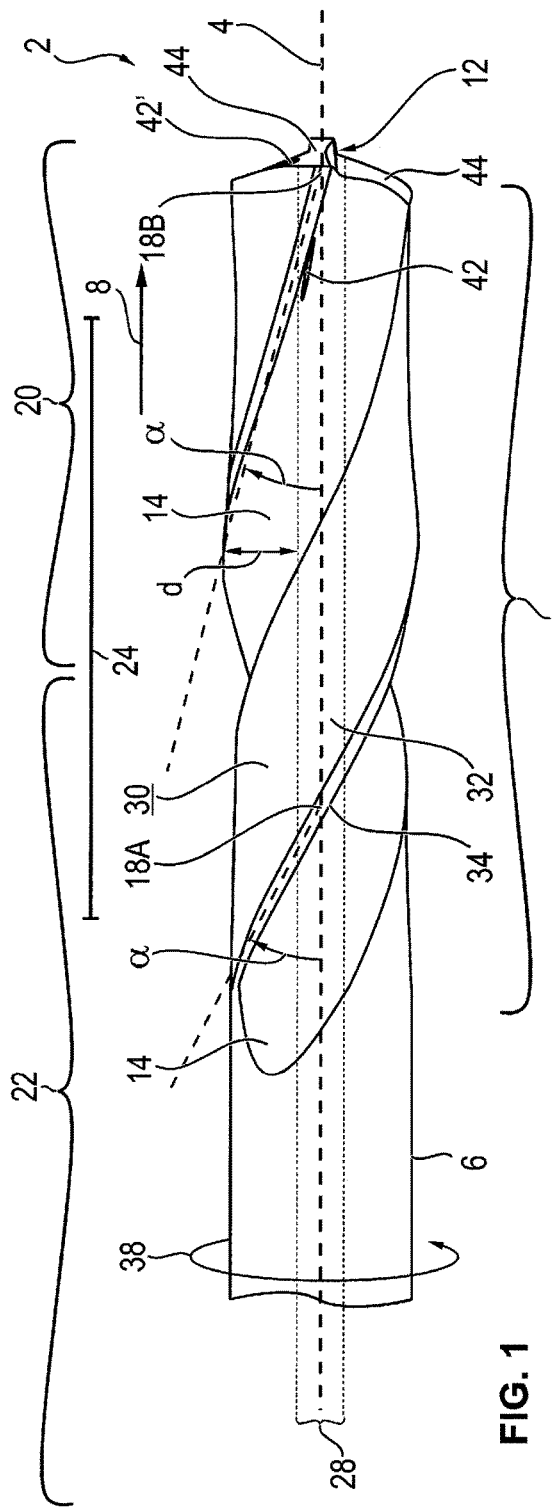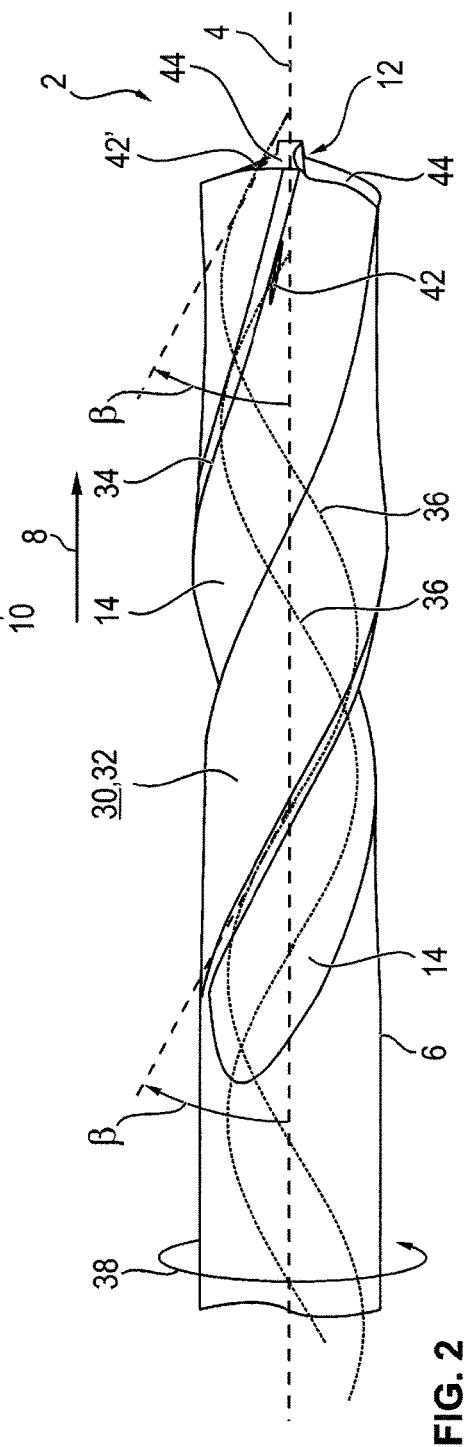
FIG. 1
FIG. 2

ROTARY TOOL AND METHOD FOR MANUFACTURING A ROTARY TOOL

RELATED APPLICATION DATA

The present application claims priority to German Patent Application Number 102014108219.2 filed Jun. 12, 2014 which is hereby incorporated by reference in its entirety.

FIELD

The invention relates to a rotary tool, in particular a drill, having a cutting part that extends in a longitudinal direction from a clamping shank arranged in a rearward region to a drill point arranged in a forward region, and in which helically running chip flutes, continuously helically running coolant channels, as well as an exit opening of each coolant channel in each respective chip flute are fashioned. The invention furthermore relates to a method for manufacturing the rotary tool.

BACKGROUND

Such rotary tools serve for the machining of a material. When specific materials or processing methods are used, an additional supply of coolant and/or lubricant is additionally necessary, or at least advantageous. For this purpose, the coolant channels, by means of which a lubricant can also generally be conveyed, are formed into the rotary tool such that exit openings result at suitable locations. Exit openings of the coolant channels may be arranged at the end surface or in chip flutes of the rotary tool, for example.

From U.S. Pat. No. 6,045,301 B, a drill can be gleaned which has helical chip flutes and helical coolant channels. To generate exit openings in the chip flutes, the coolant channels are tapped via radial bores. This requires an additional drilling step to generate the exit openings in the chip flutes.

Similarly, in EP 1 941 960 A1 bores that are transverse to coolant channels extending in a longitudinal direction are additionally formed into a drilling tool, such that these bores are each operatively connected to a coolant channel. As a result, coolant channels that each have multiple exit openings are realized. For example, an embodiment is disclosed having two coolant channels that each open into a lateral exit opening and an exit opening at an end surface. Here as well, additional process steps are disadvantageously necessary, in particular drilling on curved surfaces to fashion different exit openings.

Furthermore, in US 2006/0204345 A1 a drill is disclosed which is fluted straight over a majority of the cutting part, and accordingly also has coolant channels running in straight lines. The chip flutes are designed to be spiral shaped only in an end-surface portion. Due to the spiral-shaped course of the chip flutes, the coolant channels running in straight lines in this end-surface portion are cut by the chip flutes to form exit openings. The exit openings can be fashioned only in the chip flutes in this case. Furthermore, the chip flutes must be executed in straight lines in a sufficiently long portion, whereby in particular their chip-conveying properties and the stability of the drilling tool are negatively affected.

A rotary tool in the form of a drill is furthermore disclosed in US 2010/0150673 A1, for example. The principle disclosed there is approximately the opposite principle in comparison with that described in US 2006/0204345A1. Namely, the drill has chip flutes and coolant channels running in a spiral shape in the rear region of the cutting part, and in the front region a portion is fashioned in which only the coolant channels are not spiral-shaped, meaning they run in straight lines. The coolant channels are hereby cut by the spirally continuing chip flutes as well. In this way, exit openings of the coolant channels are achieved in the chip flutes.

However, the associated production method is complicated. In the process, a number of coolant channels are drilled into a blank extending in a longitudinal direction, such that these coolant channels each extend in straight lines and parallel to one another in the longitudinal direction. The blank is subsequently clamped at two points along the longitudinal axis and twisted about the longitudinal axis, whereby the coolant channels are transformed into a helix shape. The points are selected such that an unrotated portion with likewise unrotated coolant channels remains at the end face. A number of chip flutes are subsequently milled into the blank. A number of ribs in which the coolant channels run remain between the chip flutes. However, the chip flutes are also continued in a spiral on the unrotated portion, whereby the coolant channels present in straight lines on this portion are cut such that exit openings are fashioned in the chip flutes. A disadvantage of this is the high production cost since the blank must in particular be rotated at a first portion but must remain straight on a second portion.

SUMMARY

The invention is therefore based on the problem of specifying a rotary tool, in particular a drill, that is simple to manufacture, in which rotary tool coolant channels exit at desired exit openings without high manufacturing costs.

The problem is solved according to the invention by a rotary tool having the features of claim 1, as well as by a method having the features of claim 15. Advantageous embodiments, variants and refinements are the subject matter of the dependent claims.

To achieve this, it is provided that a rotary tool, in particular a drill or drilling tool, has a cutting part that extends in a longitudinal direction from a clamping shank arranged in a rearward region to a tool front, in particular a drill point, arranged in a forward region. Chip flutes running helically and coolant channels running continuously helically are fashioned in the cutting part. The chip flutes are each shaped with an angle of twist varying in the longitudinal direction such that, in the forward region facing towards the tool front, each coolant channel is intersected by the respective chip flute so as to fashion the exit opening.

By combining the preferably constant twist of the coolant channels and the varying angle of twist of the chip flutes, it is advantageously possible to cut the coolant channels by means of the chip flutes, and thereby to form exit openings of the coolant channels in the chip flutes. In this way in particular additional drilling for in particular subsequent formation of exit openings can be avoided. Preferably, one coolant channel is provided for each of the exit openings; each coolant channel therefore has only one exit opening associated therewith.

The particular advantage of this embodiment lies in its simple producibility. For the manufacture, a standard blank is used in a conventional manner, in which helically running coolant channels have been fashioned. The chip flutes are then formed in a conventional manner into this standard blank, wherein these are generated in the forward region with an angle of twist that is modified in comparison to the coolant channels so that the coolant channels are cut. Therefore, no additional method steps are necessary. The chip flutes are typically formed via grinding. Therefore, only a suitable control of the grinding tool is required.

The chip flute extends in a continuous helix shape in particular along the entire cutting part. In other words: the chip flute extends helically about the longitudinal axis of the rotary tool. The angle of twist defines the slope of the chip flute relative to the longitudinal axis of the rotary tool. Due to the variation of the angle of twist along the longitudinal axis, the angle of twist assumes at least two different values along the longitudinal axis.

A mechanically resistant material, for example a carbide, cermet or a ceramic material, is preferably used in particular for the cutting part. The production of such a mechanically resistant material blank typically takes place via an extrusion process with a subsequent sintering process. In the extrusion process, the material is directed through an extrusion nozzle in which shaping parts are arranged for the generation of the coolant channels. To generate the helical coolant channels, the material is pressed through the extrusion nozzle with torsion. The angle of twist is therefore defined by the torsion of the material.

What is generally understood by "continuously helical" is that the coolant channels extend at a preferably constant angle of twist over the entire length of the cutting part.

The clamping shank and the cutting part are preferably executed as one piece. The clamping shank serves for the clamping of the rotary tool in a machine tool. The coolant channel is also directed through the clamping shank and exits at the rear, namely at the side of the rotary tool facing away from the tool front, at an infeed point for coolant, and is connectable there can be connected in a suitable manner to a coolant supply.

The tool front is expediently fashioned at the front end of the cutting part, integral therewith. In principle, the rotary tool may also be in the form of a modular tool in which a separate tool head with the tool front is attached to the front of the cutting tool, for example attached so as to be exchangeable or also so as to be inseparable. The tool front is in particular a drill point having a typical point grinding, for example a relieved cone or a four-facet point.

In a preferred refinement, a web is arranged between each two chip flutes, in which web two coolant channels are fashioned, of which the one coolant channel opens into the respective chip flute and the other coolant channel opens at a different exit point. For example, the rotary tool has two chip flutes, two webs and accordingly four coolant channels. In the production of the rotary tool, the webs are formed by material of the blank that remains between two chip flutes. The web thereby follows the helical shape of the chip flutes bounding same in the circumferential direction.

If needed, guide or support margins or even a minor cutting edge are fashioned in the web. In order to fashion the exit openings for the two coolant channels at different points of the rotary tool, a chip flute adjacent to the web is fashioned such that the chip flute intersects or crosses only one of the two coolant channels and terminates in the tool front before its imaginary further path also crosses the other coolant channel. In this way it is achieved that two similarly fashioned coolant channels exit at different points of the rotary tool.

The other coolant channel expediently opens at a face, meaning in particular at a front flank of the tool face. Owing to this arrangement of the two coolant channels and the cutting of only one of the coolant channels, two exit openings are therefore associated with each major cutting edge, and a good cooling effect is thereby achieved.

For this purpose, the two coolant channels are expediently arranged side by side in the circumferential direction of the rotary tool, that is, the two coolant channels have the same radial distance from the longitudinal axis of the rotary tool. Two suitable coolant channels can thereby be particularly simply fashioned in the web and can be directed to different points of the rotary tool.

All of the coolant channels also in particular have identical cross sections, in particular identical diameters. Alternatively, however, the coolant channels have different cross sections, whereby in particular the flow rate of each coolant channel can be individually adjusted. Similarly, the coolant channels are alternatively arranged with different radial spacing, whereby in particular the exit point of each coolant channel can be adjusted individually.

Furthermore, the coolant channels suitably run with the same twist and helically about the longitudinal axis of the rotary tool.

The angle of twist of each chip flute advantageously transitions continuously in the longitudinal direction from a first angle of twist to a second angle of twist in a transition region. In other words: the angle of twist of the chip flute varies continuously in a portion of the cutting part that is referred to as a transition region. In particular, the angle of twist assumes a first value at the start of this portion, assumes a different second value at the end of the portion, and along the portion the angle of twist assumes the intermediate values in ascending or descending order. In particular, there is no occurrence of an abrupt or inconstant change of the angle of twist.

For example, the chip flute has an angle of twist with constant value on a first portion of the cutting part that faces towards the clamping shank, which angle of twist is continuously reduced to a second value on a second portion that follows in the longitudinal direction, that is, the transition region. On a following third portion, the chip flute is then again executed with a constant but accordingly reduced angle of twist.

The angle of twist is preferably smaller in the forward region, that is, the region away from the clamping shank, than in the rearward region. The chip flute is therefore adjusted to be steeper, with the result that the tool front is fashioned sturdier in the region of the major cutting edge at which the chip flute ends than it would be with a greater angle of twist. Alternatively, however, the angle of twist is increased in the direction of the face of the rotary tool. The angle of twist of all the chip flutes is advantageously the same at a common longitudinal position, which means in particular that all the chip flutes are executed similarly with regard to the angle of twist.

In particular, via suitable selection of the angle of twist it is possible to space the exit openings arranged in each of the chip flutes apart in the axial direction relative to the face. In other words: the exit openings situated in the chip flutes have in the axial direction a distance from the tool front that is adjustable in production via a corresponding design of the angle of twist. In particular, a coolant supply that is particularly optimized for a predetermined application can thereby be realized.

The angle of twist in the forward region preferably has a value in a range from 5° to 15°. The angle of twist in the rearward region preferably has a value in a range from 15° to 45°.

The cutting part of the rotary tool is preferably produced from a carbide, whereby the cutting part is particularly robust, and in particular the tool life of the rotary tool is improved. In a suitable embodiment, the rotary tool is in the form of a solid carbide drill, meaning that it is manufactured entirely out of carbide. Alternatively or additionally, the rotary tool is additionally coated at least in part. The rotary tool can then be produced particularly simply in particular in combination with an advantageous one-piece design.

BRIEF DESCRIPTION OF THE DRAWINGS

FIG. 1 shows a rotary tool in a side view.

FIG. 2 shows the rotary tool according to FIG. 1, wherein two coolant channels are indicated by dotted lines.

DETAILED DESCRIPTION

Figure 3:
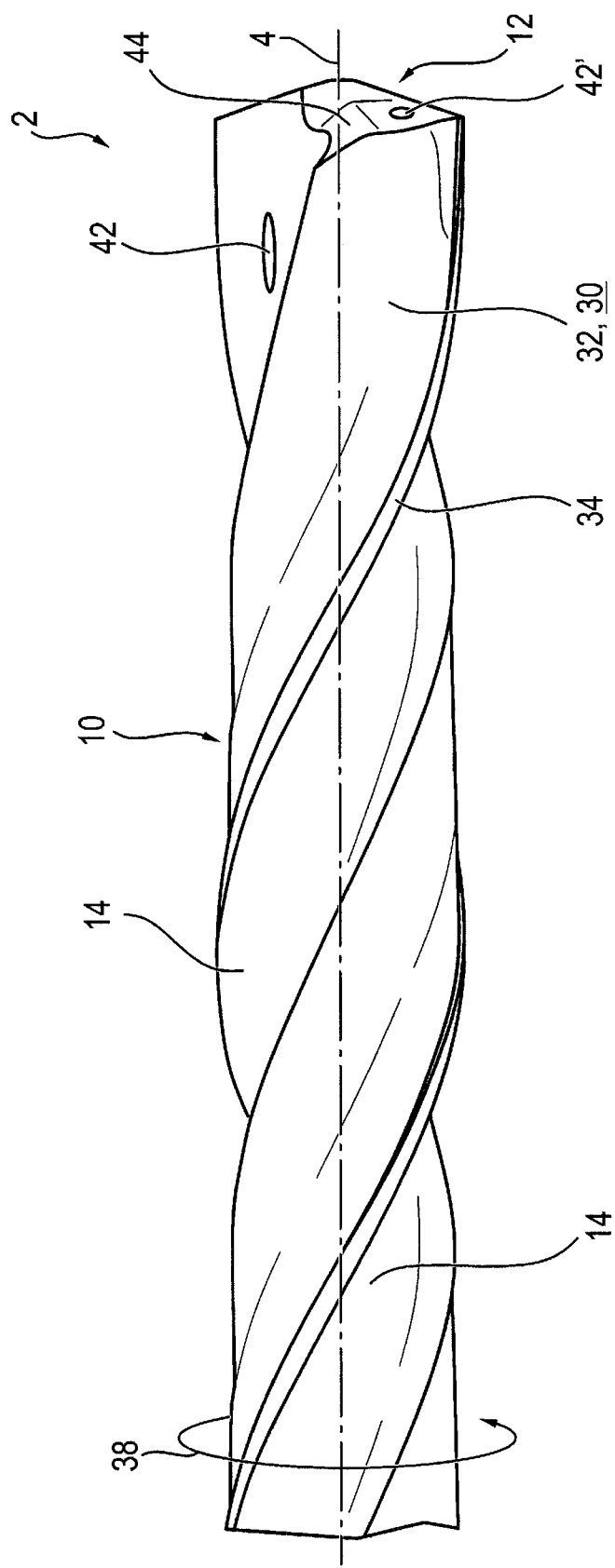
FIG. 3 shows the rotary tool according to FIG. 1 in an additional side view.

A section of a rotary tool 2 in the form of a drill is depicted in a side view in FIGS. 1 through 3. FIGS. 1 and 2 show the same view, whereas FIG. 3 shows a view rotated by 90° around the longitudinal axis 4 of the rotary tool 2. The longitudinal axis 4 corresponds in particular to the rotation axis of the rotary tool.

The rotary tool 2 comprises a clamping shank 6 that here is shown only in part and in particular serves for clamping the rotary tool 2 in a machine tool, not shown here. Following the clamping shank 6 in the axial direction, that is, in the longitudinal direction 8, is a cutting part 10 that forms a tool front 12 at its front end. In the exemplary embodiment shown here, the entire rotary tool 2 is executed as one piece; however, a multi-part, modular embodiment is also alternatively possible. For example, the tool front 12 is a separate part and in particular is manufactured from a different material than the cutting part 10 and/or the clamping shank 6. In this case, the tool front 12 is connected to the cutting tool 10 via a coupling, for example merely clamped or connected by means of a screw connection.

A number of chip flutes 14 (two in the exemplary embodiment shown here) are formed into the cutting part 10. These chip flutes 14 extend helically or in a spiral shape about the longitudinal axis 4, that is, the rotation axis of the rotary tool 2, and in the longitudinal direction 8. The helical shape of the chip flutes 14 is predetermined in particular by an angle of twist $\alpha$ that, according to the invention, varies along the longitudinal axis 4. This is depicted especially clearly in FIG. 1, in which the angle of twist $\alpha$ is indicated by dashed lines at two different longitudinal positions 18A, 18B. In particular, the chip flutes 14 shown in FIG. 1 are fashioned similarly such that these have the same angle of twist $\alpha$ at their respective longitudinal positions.

In the exemplary embodiment shown here, the angle of twist $\alpha$ is smaller in the forward region 20 of the rotary tool 2 facing towards the tool front 12 than in the rearward region 22 facing towards the clamping shank 6. In particular, the angle of twist $\alpha$ varies continuously, meaning not abruptly or inconstantly, in a transition region 24. In particular, the introduction of the chip flutes 14 by means of a grinding process is thereby particularly simplified. The angle of twist $\alpha$ that is depicted in FIG. 1 amounts to approximately 10° in the forward region and approximately 30° in the rearward region. The angle of twist $\alpha$ is in particular constant outside of the transition region. Alternatively, however, the angle of twist $\alpha$ varies over the entire cutting part 10.

The chip flutes 14 are in particular ground into the rotary tool 2 to a predetermined depth d. A core 28 remains in the center of the rotary tool 2, that is, in a region near the longitudinal axis 4. A number of webs 30—two in the exemplary embodiment shown here—are fashioned around this core 28 and between the chip flutes 14. Due to the design of the chip flutes 14, the webs 30 accordingly extend helically about the longitudinal axis 4 and in the longitudinal direction 8. In the radial direction, that is, orthogonal to the longitudinal direction 8, the webs 30 each comprise a lateral surface 32 that points outward relative to the longitudinal axis 4. In particular, these lateral surfaces 32 are each bounded by an edge that likewise extends in a helical shape, which edge here is fashioned as a minor cutting edge 34. In the exemplary embodiment shown here, this minor cutting edge 34 extends over the entire cutting part 10 and terminates at the tool front 12.

Furthermore, a number of coolant channels 36 are formed into the rotary tool 2. These are in particular designed as circular channels which extend helically about the longitudinal axis 4 and in the longitudinal direction 8 of the rotary tool 2. For this purpose, the coolant channels 36 are arranged in particular in the webs 30.

The course of two of the coolant channels 36 is illustrated by dotted lines in FIG. 2. These two coolant channels 36 run in the same web 30 but are offset in the circumferential direction 38 in such a way that the paths of the two coolant channels 36 do not cross. The coolant channels 36 have a twist $\beta$ or an angle of twist, similar to the angle of twist $\alpha$ of the chip flutes 14, with the difference that the twist $\beta$ of the coolant channels 36 is constant, meaning it does not vary along the longitudinal axis 4. For the coolant channels 36 indicated in FIG. 2, the twist $\beta$ at every longitudinal position is approximately 30°.

The rotary tool 2 shown in FIG. 2 in particular has in total four coolant channels 36, two in each of the webs 30; however, only the paths of two of the coolant channels 36 are depicted. In particular, all the coolant channels 36 here have the same twist $\beta$.

A number of exit openings 42, 42' are arranged in the forward region 20 of the rotary tool 2. In particular, precisely one exit opening 42, 42' is fashioned for each of the coolant channels 36, and each exit opening 42, 42' forms one end of the respective coolant channel 36. Due to the constant twist $\beta$ of the coolant channels 36 and the varying angle of twist $\alpha$ of the chip flutes 14, in particular two different types of exit openings 42, 42' are formed: a first type (denoted by 42) that is arranged in one of the chip flutes 14, whereby the associated coolant channel 36 opens into the respective chip flute 14; and a second type (denoted by 42') that is arranged towards the front, whereby the associated coolant channel 36 opens in a face 44 of the tool front 12.

Figure 4:
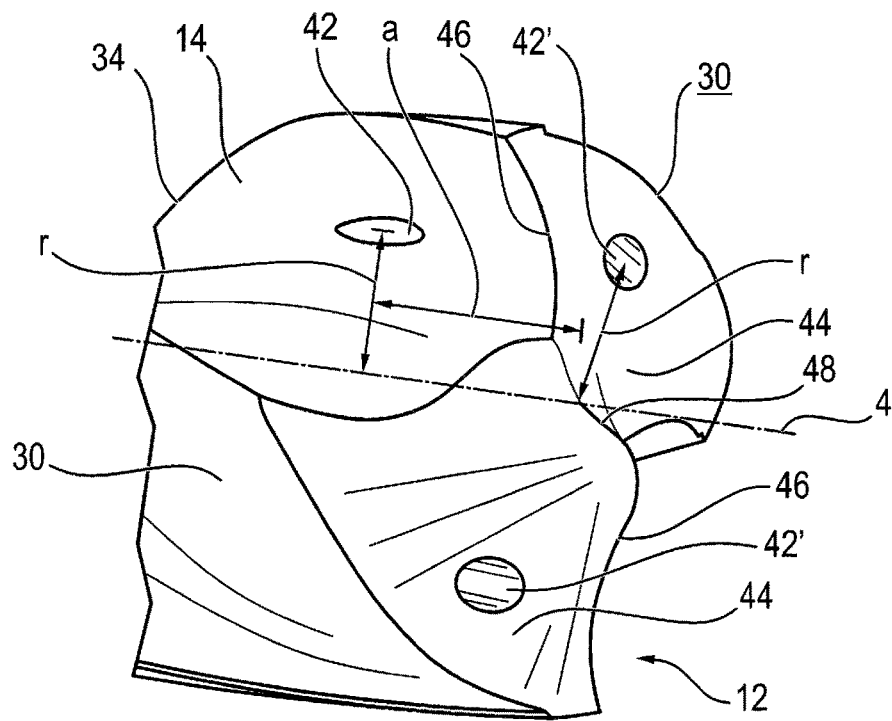
FIG. 4 shows the rotary tool according to FIG. 1 in an oblique front view.
Figure 5:
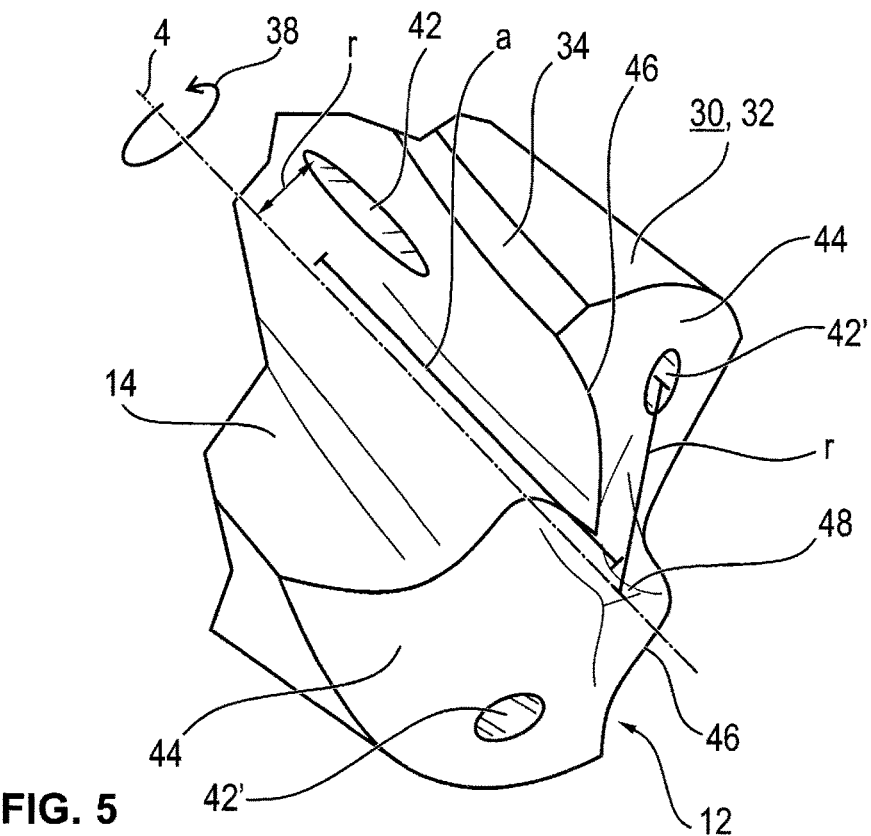
FIG. 5 shows the rotary tool according to FIG. 1 in an additional oblique front view.

This is depicted in detail in FIGS. 4 and 5. These each show a perspective view of the tool front 12 and a section of the adjoining cutting tool 10. The tool front 12 shown here comprises two face surfaces 44 that each form a tool flank and that each extend from a major cutting edge 46 to a respective chip flute 14. The major cutting edges 46 here run outward in curved or curvilinear form from a chisel edge 48 arranged in the center, meaning substantially in the radial direction, and there each transition into one of the minor cutting edges 34. Both types of exit openings 42, 42' are clearly apparent in FIGS. 4 and 5. The exit openings 42' arranged in the face surfaces 44 have a substantially circular cross section, whereas the exit openings 42 arranged in the chip flutes 14 are approximately elliptical and not circular in shape due to the respective chip flute 14 cutting same. In an alternative embodiment, however, the courses of the chip flutes 14 and of the coolant channels 36 are selected such that other shapes of the exit openings 42, 42' result. In particular, in one variant of the rotary tool 2 the coolant channels 36 are not fashioned with a circular cross section as shown here, thereby allowing in particular the shape of the exit openings 42, 42' to be configured further.

By fashioning different types of exit openings 42, 42' it is possible in particular to arrange exit openings 42, 42' on both sides of each of the major cutting edges 46, and in this way to realize an improved coolant supply. The exit openings 42 arranged in the chip flutes 14 in particular each have a defined spacing a from the tool front 12, and therefore in particular from the major cutting edges 46, in the longitudinal direction 8. Via suitable selection of the angle of twist α of the chip flutes 14 and of the twist β of the coolant channels 36, as well as of their respective courses, it is in particular possible to adjust in particular this axial spacing a.

Furthermore, the coolant channels 36 each run at a predetermined radial spacing r relative to the longitudinal axis 4 of the rotary tool 2, which radial spacing r is approximately the same for all coolant channels 36 in the exemplary embodiment shown here. However, in one variant the coolant channels 36 have different radial spacings r. In particular, a positioning of each exit opening 42, 42' relative to the tool front 12 can be designed more flexibly by means of the respective radial spacing r.

The invention claimed is:

1. A rotary tool comprising:
   a cutting part extending in a longitudinal direction of the rotary tool, between a clamping shank in a rearward region and a tool front in a forward region;
   said cutting part comprising:
     chip flutes which run helically, wherein each of said chip flutes is defined by a twist angle which varies in the longitudinal direction of said rotary tool;
     coolant channels which run helically; and
     a web extending between two of said chip flutes;
     wherein two of said coolant channels are disposed in said web;
   wherein a first one of said two coolant channels extends to an exit opening in one of said chip flutes; and
   wherein a second one of said two coolant channels extends to an exit opening at a location other than in said one of said chip flutes;
   said first and second coolant channels running in parallel with respect to one another.

2. The rotary tool according to claim 1, wherein:
   said tool front comprises a face surface disposed at an end of said tool front; and
   said second coolant channel extends to an exit opening at said face surface.

3. The rotary tool according to claim 1, wherein said first and second coolant channels run helically in parallel to one another, and about a common axis.

4. The rotary tool according to claim 1, wherein:
   said cutting part comprises a transition region; and
   the twist angle of at least one of said flutes changes in said transition region.

5. The rotary tool according to claim 4, wherein, in said transition region, the twist angle of said at least one of said flutes transitions continuously from a first twist angle to a second twist angle.

6. The rotary tool according to claim 4, wherein the twist angle of said at least one of said flutes is smaller in said forward region than in said rearward region.

7. The rotary tool according to claim 4, wherein the twist angle of said at least one of said flutes, in said forward region, is between about 5° and about 15°.

8. The rotary tool according to claim 4, wherein the twist angle of said at least one of said flutes, in said rearward region, is between about 15° and about 45°.

9. The rotary tool according to claim 1, wherein said cutting part is formed from carbide.

10. The rotary tool according to claim 1, comprising a drill.

11. The rotary tool according to claim 1, comprising a solid carbide drill.

12. The rotary tool according to claim 1, wherein said exit opening in said one of said chip flutes is defined by an intersection of said first coolant channel with said one of said chip flutes.

13. The rotary tool according to claim 1, wherein said exit opening in said one of said chip flutes has an elliptical and non-circular shape.

14. The rotary tool according to claim 1, wherein said chip flutes are formed via grinding.

15. A method of manufacturing a rotary tool, said method comprising:
   providing a cutting part extending in a longitudinal direction of the rotary tool, between a clamping shank in a rearward region and a tool front in a forward region;
   said providing of a cutting part comprising:
     providing chip flutes which run helically, wherein each of the chip flutes is defined by a twist angle which varies in the longitudinal direction of the rotary tool;
     providing coolant channels which run helically; and
     providing a web extending between two of the chip flutes;
   said providing of coolant channels comprising:
     disposing two of the coolant channels in the web;
     extending a first one of the two coolant channels to an exit opening in one of the chip flutes; and
     extending a second one of the two coolant channels extends to an exit opening at a location other than in the one of the chip flutes;
     wherein the first and second coolant channels run in parallel with respect to one another.

16. The method according to claim 15, wherein:
   the tool front comprises a face surface disposed at an end of the tool front; and
   said extending of the second coolant channel comprises extending the second coolant channel to an exit opening at the face surface.

17. The method according to claim 15, wherein the first and second coolant channels run helically in parallel to one another, and about a common axis.

18. The rotary tool according to claim 15, wherein the exit opening in the one of the chip flutes is defined by an intersection of the first coolant channel with the one of the chip flutes.

19. The rotary tool according to claim 15, wherein the chip flutes are formed via grinding.

* * * * *